United States Patent [19]
Kremer

[11] Patent Number: 5,440,540
[45] Date of Patent: Aug. 8, 1995

[54] RING INTERWORKING BETWEEN A BIDIRECTIONAL LINE-SWITCHED RING TRANSMISSION SYSTEM AND ANOTHER RING TRANSMISSION SYSTEM

[76] Inventor: Wilhelm Kremer, 59 Colonial Dr., Dracut, Mass. 01826

[21] Appl. No.: 855,795

[22] Filed: Mar. 26, 1992

[51] Int. Cl.[6] .............................................. H04J 1/16
[52] U.S. Cl. ..................................... 370/16.1; 340/827
[58] Field of Search ...................... 370/16, 16.1, 85.13, 370/85.12, 85.14, 85.15; 371/8.1, 11.1, 8.2; 340/825.01, 827; 379/221

[56] References Cited

U.S. PATENT DOCUMENTS

| | | | |
|---|---|---|---|
| 4,538,264 | 8/1985 | Bahr et al. | 371/8 |
| 4,759,009 | 7/1988 | Casady et al. | 370/85.15 |
| 4,835,763 | 5/1989 | Lau | 370/16 |
| 5,179,548 | 1/1993 | Sandesara | 370/85.12 |
| 5,218,600 | 6/1993 | Schenkyr et al. | 370/16.1 |
| 5,218,604 | 6/1993 | Sosnosky | 370/85.14 |

OTHER PUBLICATIONS

"Sonet Line Protection Switched Ring APS Protocol", T1X1.5/91-026, J. Baroni et al., AT&T Network Systems.
"Sonet King Applications for Survivable Fiber Loop Networks", *IEEE Communications Magazine*, Jun. 1991, J. Sosnosky et al., pp. 51–58.
"Further Considerations on 2-Fiber Bidirectional Line Switched OC-48 Rings", Contribution to T1 Standards Project—T1X1.5/91-019, G. Copley et al. Feb. 6, 1991.

*Primary Examiner*—Douglas W. Olms
*Assistant Examiner*—Dang Ton
*Attorney, Agent, or Firm*—Mark K. Young; Thomas Stafford

[57] ABSTRACT

Communications circuit connectivity between a bidirectional line-switched ring transmission system and another ring transmission system is continued in the presence of the failure of a first shared node for communications circuits between the ring transmission systems by employing at least one additional shared node for the communications circuits; provisioning one or more duplex communications circuits between the first shared node and the additional shared node; and selectively allowing the one or more duplex communications circuits between the shared nodes to be established in the bidirectional line-switched ring when a ring node in the bidirectional line-switched ring in the first shared node has failed.

36 Claims, 8 Drawing Sheets

FIG. 5

RING NODE ID TABLE

| NODE ID |
|---------|
| 110 ID  |
| 111 ID  |
| 112 ID  |
| 113 ID  |
| 114 ID  |
| 115 ID  |

FIG. 6

COMMUNICATIONS CIRCUIT ID TABLE FOR RING NODE 111

| STS # | A TERMINATION | Z TERMINATION(S) | INTERWORKING COMMUNICATION CIRCUIT |
|-------|---------------|------------------|-------------------------------------|
| a     | 110           | 111              | NO                                  |
| b     | 111           | 113,115          | NO                                  |
| c     | 110           | 112,114          | YES                                 |
| d     | 111           | 115              | NO                                  |
| ⋮     | ⋮            | ⋮               | ⋮                                  |

RING INTERWORKING BETWEEN A BIDIRECTIONAL LINE-SWITCHED RING TRANSMISSION SYSTEM AND ANOTHER RING TRANSMISSION SYSTEM

CROSS-REFERENCE TO RELATED APPLICATION

U.S. patent application Ser. No. 855,782 was filed concurrently herewith.

1. Technical Field

This invention relates to ring transmission systems and, more particularly, to bidirectional line-switched ring transmission systems.

2. Background of the Invention

It has become increasingly important to maintain communications connectivity in the presence of transmission system failures. To this end, ring type transmission systems have been proposed that interconnect with one or more other ring type transmission systems. Consequently, individual communications circuits may have a termination in one ring transmission system and another termination in some other ring transmission system. It is especially desirable for a communications circuit having a termination in a bidirectional line-switched ring and a termination in another ring, either path-switched or bidirectional line-switched, to survive a failure of a node that is "shared" by both rings carrying service for the particular communications circuit. The shared node "interworks", i.e., transports, communications circuits between the bidirectional line-switched ring and the other ring. To this end, the shared node includes a ring node in the bidirectional line-switched ring and a ring node in the other ring which are coupled via a so-called "hand-off" duplex link.

Heretofore, when a ring node of the shared node failed in a bidirectional line-switched ring there was no operative mechanism for passing a duplex communications circuit in the bidirectional line-switched ring that was terminated in the failed ring node of the shared node to the other ring. Indeed, in bidirectional line-switched ring transmission systems duplex communications circuits which terminate at a shared node including the failed ring node were "squelched", i.e., prevented from propagating further in the bidirectional line-switched ring, in order to prevent a misconnection with another duplex communications circuit propagating in the other direction of the bidirectional line-switched ring. Consequently, the communications circuit connectivity was lost, resulting in a communications failure.

SUMMARY OF THE INVENTION

The problems related to a failed ring node of a first shared node in a bidirectional line-switched ring transmission system and another ring transmission system are overcome, in accordance with the invention, by employing at least one additional shared node between the bidirectional line-switched ring and the other ring; provisioning one or more duplex communications circuits between the ring nodes of the shared nodes in the bidirectional line-switched ring; and selectively allowing one or more secondary communications circuit connections to be established to the ring node in the additional shared node, when the ring node in the first shared node has failed. The selectively provided one or more secondary communications circuit connections to the ring node in the additional shared node "heal", in accordance with the principles of my invention, the one or more duplex communications circuits having a termination in the bidirectional line-switched ring and a termination in the other ring when the ring node in the first shared node of the bidirectional line-switched ring has failed. The selectively provided one or more secondary communications circuit connections are realized, in accordance with the invention, on a communications circuit-by-communications circuit basis, by controllably not squelching communications circuits terminated in the failed ring node in the first shared node in the bidirectional line-switched ring provided, however, that neither the ring node in the additional shared node nor a ring node at which the one or more communications circuits terminate in the bidirectional line-switched ring has not also failed.

In accordance with another aspect of the invention, a failure of the hand-off link incoming to the ring node in the first shared node of the bidirectional line-switched ring is "healed" by employing a selector to controllably select between an incoming communications circuit from the hand-off link in the first shared node and the same communications circuit being supplied from the ring node in the additional shared node. A broadcast element is employed in the ring node of the first shared node to "heal" a communications circuit to be "dropped" by passing it on to the ring node in the additional shared node when the hand-off duplex link in the first shared node has failed. The broadcast element continues the communications circuit to be dropped on to the ring node of the additional shared node in the bidirectional line-switched ring.

BRIEF DESCRIPTION OF THE DRAWING

In the drawing:

FIG. 5 is an exemplary ring node ID table included in memory of the controller of FIG. 2;

FIG. 6 is an exemplary communications circuit ID table also included in memory of the controller of FIG. 2 for ring node 102;

DETAILED DESCRIPTION

Figure 1:
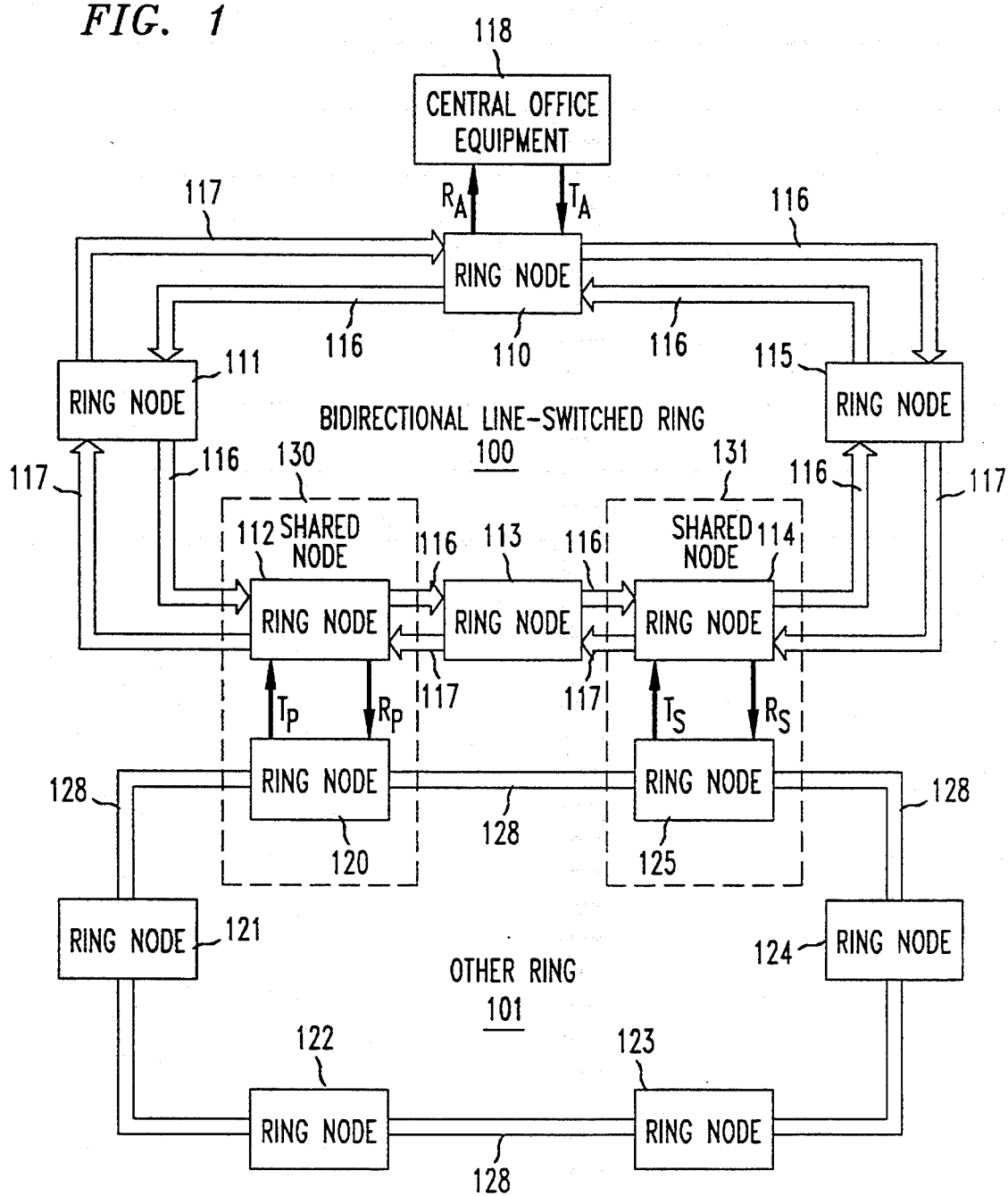
FIG. 1 shows, in simplified block diagram form, a bidirectional line-switched ring transmission system interworking with another ring transmission system including the invention.

FIG. 1 shows, in simplified form, bidirectional line-switched ring transmission system 100 interworking with another ring transmission system 101. The other ring transmission system 101 could be, for example, a path-switched ring or a bidirectional line-switched ring. In this example, bidirectional line-switched ring 100 includes ring nodes 110 through 115, and other ring 101 includes ring nodes 120 through 125. It should be noted that ring nodes 110 through 115 may be structurally different from ring nodes 120 through 125. This, would depend on the type of ring transmission system that comprises other ring 101. Ring nodes 112 and form first shared node 130 for interworking communications circuits between bidirectional line-switched ring 100 and other ring 101. Similarly, ring nodes 114 and 125 form an additional shared node 131 for interworking communications circuits between bidirectional line-switched ring 100 and other ring 101. It is noted that as shown there is a direct connection between the ring nodes of the shared nodes, however, it will be apparent that other system elements may be placed in the interface between ring transmission systems. One example of such a system interface is the use of an electronic digital cross-connect system between the ring nodes of each of the ring systems.

Ring nodes 110 through 115 are interconnected by transmission path 116 in a counter-clockwise direction and by transmission path 117 in a clockwise direction to form bidirectional line-switched ring 100. In this example, transmission paths 116 and 117 are comprised of optical fibers and each could be comprised of a single optical fiber or two (2) optical fibers. That is, bidirectional line-switched ring transmission system 100 could be either a two (2) optical fiber or a four (4) optical fiber system. In a two (2) optical fiber system, each of the fibers in transmission paths 116 and 117 includes service bandwidth and protection bandwidth. In a four (4) optical fiber system, each of transmission paths 116 and 117 includes an optical fiber for service bandwidth and a separate optical fiber for protection bandwidth. Such bidirectional line-switched ring transmission systems are known. Similarly, ring nodes 120 through 125 are interconnected by transmission path 128 to form the other ring 101. In this example, transmission of digital signals in the SONET digital signal format is assumed. However, it will be apparent that the invention is equally applicable to other digital signal formats, for example, the CCITT synchronous digital hierarchy (SDH) digital signal formats. In this example, it is assumed that an optical OC-N SONET digital signal format is being utilized for transmission over transmission paths 116 and 117 in bidirectional line-switched ring 100 and a similar or some other digital signal over transmission path 128 in other ring 101. Further details of other ring 101 and ring nodes 120 through 125 are not necessary to an understanding the invention and, therefore, are omitted. The SONET digital signal formats are described in a Technical Advisory entitled "Synchronous Optical Network (SONET) Transport Systems: Common Generic Criteria", TA-NWT-000253, Bell Communications Research, Issue 6, September 1990.

It is noted that requests and acknowledgments for protection switch action, in bidirectional line-switched ring 100, are transmitted in an automatic protection switch (APS) channel of the protection bandwidth on each of transmission paths 116 and 117. The APS channel, in the SONET format, comprises the K1 and K2 bytes in the SONET overhead of the protection bandwidth. The K1 byte indicates a request of a communications circuit for switch action. The first four (4) bits of the K1 byte indicate the type of switch and the last four (4) bits indicate the ring node identification (ID). The K2 byte indicates an acknowledgment of the requested protection switch action. The first four (4) bits of the K2 byte indicate the ring node ID and the last 4 bits indicate the action taken. For purposes of this description, a "communications circuit" is considered to be a SONET STS-3 digital signal having its entry and exit points on the ring.

Each of ring nodes 110 through 115 comprises an add-drop multiplexer (ADM). Such add-drop multiplexer arrangements are known. For genetic requirements of a SONET based ADM see the Technical Reference entitled "SONET ADD-DROP Multiplex Equipment (SONET ADM) GENERIC CRITERIA", TR-TSY-000496, Issue 2, September 1989, Supplement 1, September 1991, Bell Communications Research. In this example, the ADM operates to pass signals through the ring node, to add signals at the ring node, to drop signals at the ring node, to bridge signals during a protection switch and to loop-back-switch signals during a protection switch at the ring node.

It should be noted that each of ring nodes 110 through 115 are provisioned with the identities of all active communications circuits including those being added and/or dropped at the node and those passing through. Additionally, those ring interworking communications circuits terminated in shared nodes 130 and 131 are provisioned as such communications circuits. The provisioning of, for example, loop-back- switching node 111 is shown in FIGS. 5 and 6 and described below. It is noted that ring node 111 is the loop-back-switching ring node for ring node 112 in shared node 130. To this end, ring node 111 is provisioned, in accordance with the principles of nay invention, to provide a secondary communications circuit connection for any ring interworking communications circuits terminating in ring node 112 to ring node 114 in additional shared node 131, when ring node 112 has failed. Observe that the secondary communications circuit connection could be assigned to protection bandwidth. This secondary communications circuit is established, in accordance with the invention, on a communications circuit-by-communications circuit basis by controllably allowing the loop-back-switching of communications circuits terminated in ring node 112 to ring node 114 and by controllably not squelching those communications circuits. Additionally, it will be apparent that in the loop-back-switching operation, if the signal is incoming in service bandwidth on transmission path 116, it will be loop-back-switched to the protection bandwidth on transmission path 117 and vice versa, except for communications circuits being added and/or dropped at the ring node. If the signal is incoming in protection bandwidth on transmission path 116, it will be loop-back-switched to the service bandwidth on transmission path 117 and vice versa.

Figure 2:
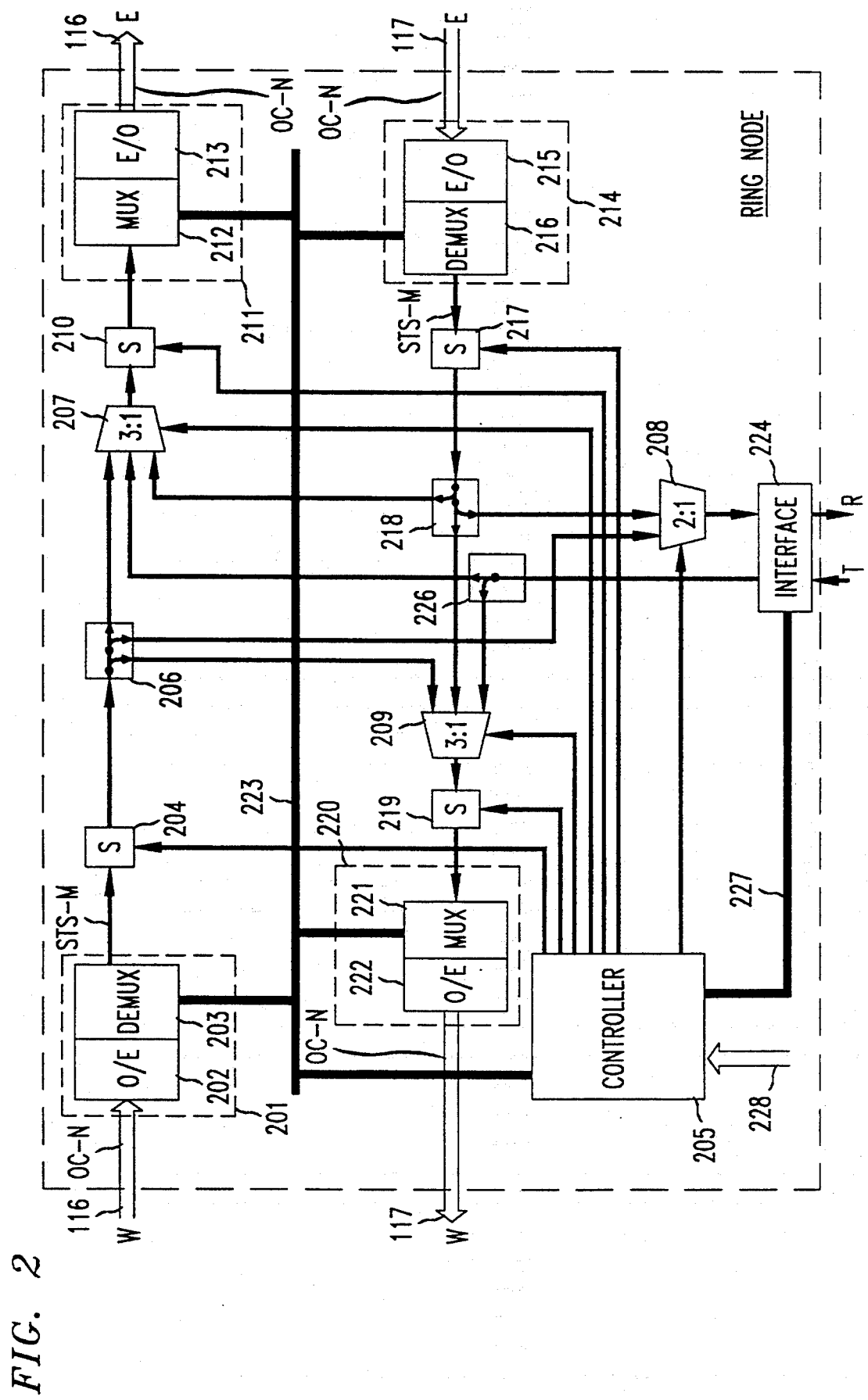
FIG. 2 shows, in simplified block diagram form, details of a ring node including an embodiment of the invention.
Figure 3:
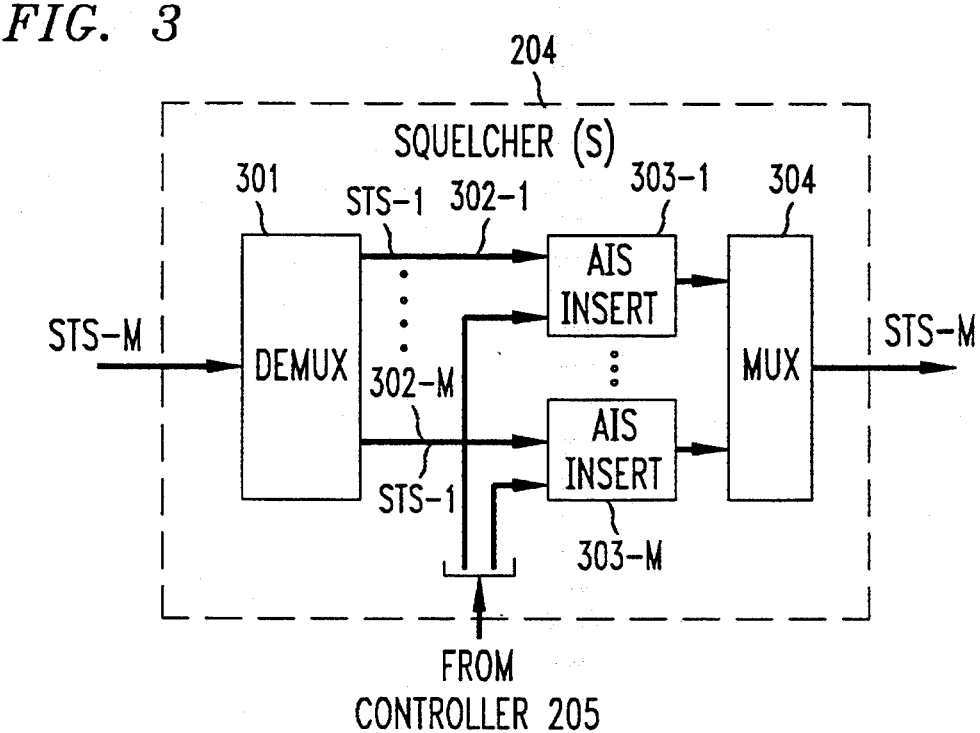
FIG. 3 shows, in simplified block diagram form, details of a squelcher used in the ring node of FIG. 2.
Figure 4:
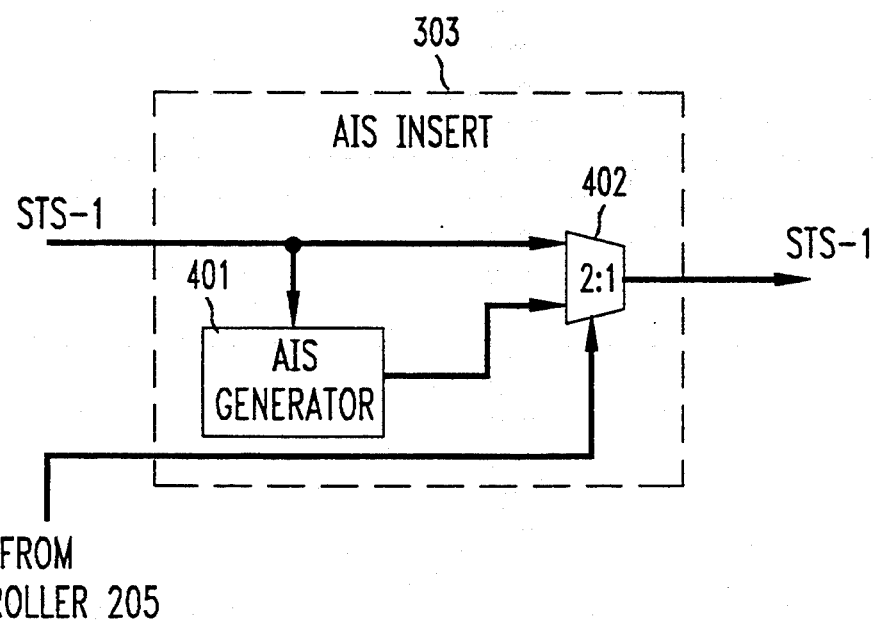
FIG. 4 shows, in simplified block diagram form, details of an AIS insert unit employed in the squelcher of FIG. 3.

FIG. 2 shows, in simplified block diagram form, details of ring nodes 110 through 115, including an embodiment of the invention. In this example, a west (W)-to-east (E) digital signal transmission direction is assumed in the service bandwidth and the protection bandwidth on transmission path 116. It will be apparent that operation of the ring node and the ADM therein would be similar for an east (E)-to-west (W) digital signal transmission direction in the service bandwidth and the protection bandwidth on transmission path 117. Specifically, shown is transmission path 116 entering the ring node and supplying an OC-N SONET optical signal to receiver 201, where N could be, for example, 3, 12 or 48. Receiver 201 includes an optical/electrical (O/E) interface 202 and a demultiplexer (DEMUX) 203, which yields at least one (1) STS-M SONET digital signal. Such O/E interfaces and demultiplexers are known. In this example, M is assumed to be three (3) and N is greater than M. The STS-M signal output from DEMUX 203 is supplied to squelcher (S) 204, which under control of controller 205, controllably squelches, i.e., blocks, particular incoming communications circuits. Details of squelcher (S) 204 are shown in FIGS. 3 and 4 and its operation is described below. Thereafter, the STS-M signal, squelched or otherwise, is supplied to broadcast element 206. A broadcast element replicates the STS-M signal supplied to it and supplies the replicated signals as a plurality of individual outputs. Such broadcast elements are known. Broadcast element 206 generates three identical STS-M signals and supplies one STS-M signal to an input of 3:1 selector 207, a second STS-M signal to an input of 2:1 selector 208 and a third STS-M signal to an input of 3:1 selector 209. An STS-M signal output from 3:1 selector 207 is supplied to squelcher (S) 210, which is identical to squelcher (S) 204. Squelcher (S) 210 is employed, under control of controller 205, to squelch particular outgoing communications circuits. The STS-M signal output from squelcher (S) 210 is supplied to transmitter 211 and, therein, to multiplexer (MUX) 212. The output of MUX 212 is an electrical OC-N digital signal, which is interfaced to transmission path 116 via electrical/optical (E/O) interface 213. Such multiplexers (MUXs) and electrical/optical (E/O) interfaces are well known.

Similarly, in the east (E)-to-west (W) direction an OC-N optical signal is supplied via transmission path 117 to receiver 214 and, therein, to optical/electrical (O/E) interface 215. In turn, demultiplexer (DEMUX) 216 yields a STS-M signal which is supplied via squelcher (S) 217 to broadcast element 218. Broadcast element 218 replicates the STS-M signal into a plurality of identical STS-M signals, in this example, three (3). One STS-M signal is supplied to an input of 3:1 selector 207, a second STS-M signal is supplied to an input of 2:1 selector 208 and a third STS-M signal is supplied to an input of 3:1 selector 209. An output from 3:1 selector 209 is supplied via squelcher (S) 219 to transmitter 220. In transmitter 220, multiplexer (MUX) 229 multiplexes the STS-M into an electrical OC-N and, then, electrical/optical (E/O) interface 222 supplies the optical OC-N signal to transmission path 117.

Controller 205 operates to effect squelching of communications circuits and, in accordance with the principles of the invention, to selectively allow communications circuit connections to ring node 114 in shared node 131 for communications circuits terminating in ring node 112, when ring node 112 in shared node 130 has failed. Controller 205 communicates with demultiplexers 203 and 216 and multiplexers 212 and 221 via bus 223 and with interface 224 via bus 227. Specifically, controller 205 monitors the incoming digital signals to determine loss-of-signal, alarm conditions, presence of alarm indication signal (AIS), SONET format K bytes and the like. Additionally, controller 205 causes the insertion of appropriate K byte messages for protection switching purposes, examples of which are described below. To realize the desired deterministic squelching of the communications circuits, and the selective allowing of communications circuit connections to ring node 114 for circuits terminating in ring node 112, controller 205 is advantageously provisioned via 228, in accordance with the principles of the invention, with the identifies (IDs) of all the ring nodes in bidirectional line-switched ring 100 and the identities of all the communications circuits passing through the ring node, including those terminated in a ring interworking node, as well as, those communications circuits being added and/or dropped at the ring node. The squelching of communications circuits and the selective allowance of communications circuit connections to ring node 114 when ring node 112 has failed, under control of controller 205 to effect the invention is described below.

Interface 224 is employed to interface to a particular interface and can include any desired arrangement. For example, interface 224 could include a DS3 digital signal interfacing to a DSX, a STS-1E (electrical) SONET digital signal interfacing to a DSX, an optical extension interface to an OC-N SONET optical signal or the like. Such interface arrangements are known. Specifically, a signal (R) to be dropped at the ring node is supplied to interface 224 via 2:1 selector 208, under control of controller 205, from either broadcast element 206 or broadcast element 218. A signal (T) to be added at the ring node is supplied to interface 224 where it is converted to the STS-M digital signal format, if necessary. The STS-M digital signal is then supplied to broadcast element 226 where it is replicated. The replicated STS-M digital signals are supplied by broadcast element 226 to an input of 3:1 selector 207 and an input of 3:1 selector 209. In this example, 3:1 selectors 207 and 209, under control of controller 205, select the signal being added for transmission in the service or protection bandwidth on either transmission path 116 or transmission path 117.

It should be noted that, in this example, the normal transmission path for a duplex digital signal being added at the ring node would be in the service bandwidth on transmission path 116 and transmission path 117, for example, towards the west (W). If there were to be a protection switch, the signal (T) being added from interface 224 would be bridged via broadcast element 226 and chosen by 3:1 selector 207, under control of controller 205, to the protection bandwidth on transmission path 116. Similarly, if there were to be a loop-back protection switch and the ring node was adjacent to the failed ring node, the signal (R) to be dropped at the ring node would be received in the protection bandwidth on transmission path 117 and would be switched from broadcast element 218 via 2:1 selector 208 to interface 224. Otherwise, the signal (R) to be dropped would be switched in a ring node adjacent the failure from the protection bandwidth on transmission path 117 to the service bandwidth on transmission path 116 and received at the ring node in usual fashion. Then, the signal (R) being dropped from transmission path 116 is supplied via broadcast element 206 and 2:1 selector 208 to interface 224.

As indicated above, controller 205 monitors the status of interface 224 and the digital signal supplied thereto via bus 227. Specifically, controller 205 monitors interface 224 for loss-of-signal, coding violations and the like.

Under control of controller 205, digital signals may be passed through, added at, dropped at, bridged at or loop-back-switched at the ring node. In ring node 112 of shared node 130, a drop and pass-on of a first transmission direction of a duplex communications circuit is realized, under control of controller 105, in accordance with the principles of the invention, by broadcast element 206 and 3:1 selector 207. To this end, broadcast element 206 replicates the STS-M digital signal and supplies one of the resulting STS-M digital signals to 2:1 selector 208 and another STS-M to 3:1 selector 207. In this manner, the same STS-M digital signal is available to be dropped in ring node 112 and passed-on to ring node 114. If interface 224 or the hand-off duplex link to interface 224 in ring node 112 fails, a good STS-M is still supplied in ring node 114 to ring node 125 of other ring 101 in shared node 131. A loop-back-switch of an STS-M digital signal incoming in the service bandwidth on transmission path 116 is effected by controller 205 causing 3:1 selector 209 to select the STS-M digital signal from broadcast element 206 and supplying it via squelcher (S) 219 to transmitter 220. In turn, transmitter 220 supplies an OC-N optical signal to the protection bandwidth on transmission path 117. It will be apparent that in the loop-back-switch operation, if the signal is incoming in service bandwidth on transmission path 116, it will be loop-back-switched to the protection bandwidth on transmission path 117 and vice versa, except for communications circuits being added and/or dropped at the ring node. If the signal is incoming in the protection bandwidth on transmission path 116, it will be loop-back-switched to the service bandwidth on transmission path 117 and vice versa. A signal to be added at the ring node is supplied from interface 224, replicated via broadcast element 226 and selected either by 3:1 selector 207 or 3:1 selector 209, under control of controller 205, to be added on transmission path 116 or transmission path 117, respectively. A digital signal to be dropped at the ring node is selected by 2:1 selector 208, under control of controller 205, either from broadcast element 206 (transmission path 116) or broadcast element 218 (transmission path 117). The pass-through and loop-back functions for a signal incoming on transmission path 117 is identical to that for an incoming signal on transmission path 116. In ring node 112 of shared node 130, the replication of the duplex communications circuit from ring node 114 of shared node 131 for circuits intended to be added in ring node 112, is realized under control of controller 105, in accordance with the invention, by 3:1 selector 209 selecting an incoming signal from ring node 114 when either interface 224 or the hand-off duplex link in ring node 112 fails.

Possible communications circuit misconnections are avoided in bidirectional line-switched ring 100, by deterministically squelching each communications circuit terminated in a failed ring node, other than a communications circuit terminated in its primary interworking ring node, in ring loop-back-switching nodes adjacent to the failed ring nodes(s). A primary interworking ring node for a communications circuit is provisioned to broadcast the communications circuit to a secondary interworking ring node and to controllably select a communications circuit from the secondary interworking ring node. In this example, the primary interworking ring node is the ring node at which a communications circuit is intended to be transported to and from other ring 101. To this end, each ring node in bidirectional line-switched ring transmission system 100 is typically equipped to effect the desired squelching via squelchers (S) 204, 210, 217 and 219, under control of controller 205. In this example, both incoming and outgoing communications circuits are squelched, however, it may only be necessary to squelch outgoing communications circuits.

Additionally, in this example, ring nodes 111 and 113 adjacent ring node 112 in shared nodes 130 are provisioned, in accordance with the principles of the invention, to selectively allow a secondary communications circuit connection to ring node 114 in secondary shared node 131 for communications circuits terminated in ring node 112, when ring node 112 fails. This secondary communications circuit connection is realized, in accordance with the principles of the invention, by not squelching the communications circuits terminated in ring node 112 in adjacent nodes 111 and 113 when ring node 112 fails. Instead, the communications circuits terminated in ring node 112 in their primary shared node 130 are loop-back-switched in ring nodes 111 and 113 and supplied to ring node 114 in their secondary shared node 131. It should be noted, however, if either ring node 114 in shared node 131 or the ring node terminating the communications circuit in ring 100 has also failed, then the communications circuits terminated in their primary interworking ring node 112 are squelched.

FIG. 3 shows, in simplified block diagram form, details of an exemplary squelcher (S) unit. Specifically, the STS-M digital signal is supplied to demultiplexer (DEMUX) 301 where it is demultiplexed into its constituent M STS-1 digital signals 301-1 through 302-M. The M STS-1 digital signals are supplied on a one-to-one basis to AIS insert units 303-1 through 303-M. AIS insert units 303-1 through 303-M, under control of controller 205, insert the AIS in the STS-1 digital signals included in the communications circuits, i.e., STS-M digital signals, to be squelched. Details of AIS insert units 303 are shown in FIG. 4 and described below. Thereafter, the M STS-1 digital signals are multiplexed in multiplexer (MUX) 304 to yield the desired STS-M digital signal. The details of multiplex schemes for the STS-M digital signal are described in the technical advisory TA-NWT-000253, noted above.

FIG. 4 shows, in simplified block diagram form, details of AIS insert units 303. Specifically, shown is a STS-1 digital signal being supplied to AIS generator 401 and to one input of 2:1 selector 402. AIS generator 401 operates to insert AIS in the STS-1 digital signal. As indicated in the technical advisory TA-NWT-000253, the STS path AIS is an all ones (1's) signal in the STS-1 overhead bytes H1, H2 and H3 and the bytes of the entire STS SPE (synchronous payload envelope). Selector 402 selects as an output, under control of controller 205, either the incoming STS-1 digital signal or the STS-1 digital signal with AIS inserted from AIS generator 401.

FIG. 5 is a table including the identification (ID) of ring nodes 110 through 115 for bidirectional line-switched ring 100. The ring node IDs are stored in a look-up table which is provisioned via 228 in memory of controller 205 (FIG. 2). As indicated above, the ring node IDs are 4 bit words and are included in the second 4 bits of the K1 bytes and the first 4 bits of the K2 bytes in the APS channel.

FIG. 6 is illustrative of a table including the identification of all the active communications circuits in a ring node, in this example, ring node 111 for a counter-clockwise orientation of nodes 110 through 115. The active communications circuits include those being added, being dropped or passing through ring node 111 and, additionally, those terminated in an interworking ring node. The table including the IDs of the active communications circuits in the ring node are provisioned via 228 in a look-up table in memory of controller 205. Shown in the table of FIG. 6 are the STS-M communications circuit numbers (#) a through d, the ring node including the communications circuit entry point, i.e., the A termination for the communications circuit, and the ring node(s) including the communications circuit exit point(s), i.e., the Z termination(s) for the communications circuit and whether the communications circuit is an interworking communications circuit. An interworking communications circuit is one which has terminations in both bidirectional-line switched ring 100 and other ring 101, and is to be protected in accordance with the invention. For a communications circuit, for example, STS-M(b) and which is being broadcast to a plurality of ring nodes, all the Z termination ring nodes are shown and it is identified as not being an interworking communications circuit. A communications circuit terminated in its primary interworking ring node 112 in shared node 130 is shown as being broadcast to its secondary interworking ring node 114 in shared node 131 and identified in the provisioning as being a ring interworking communications circuit. Thus, the communications circuit ID table of FIG. 6, shows that STS-M(a) enters ring 100 at ring node 110 and exits ring 100 at ring node 111, and is not a ring interworking communications circuit. STS-M(b) enters ring 100 at ring node 111 and is broadcast to ring nodes 113 and 115, and is not interworking communications circuit nodes. STS-M(c) enters ring 100 at ring node 110 and normally exits at ring node 112, and is a interworking communications circuit. If interworking ring node 112 fails, the communications circuits terminated in it will not be squelched in adjacent ring nodes 111 and 113, in accordance with the principles of the invention, but will be supplied via loop-back-switching to its secondary interworking ring node 114. Provided, however, that neither the secondary interworking ring node 114 for the communications circuit nor the ring node terminating the communications circuit in ring 100 has also failed. STS-M(d) enters ring 100 at ring node 111 and exits at ring node 115. Although the ring nodes designated A terminations are considered entry points and the ring nodes designated Z terminations are considered exit points, it will be apparent that the individual communications circuits may be duplex circuits having entry and exit points at each such node. It should be noted that heretofore only the communications circuits being added an&or dropped at the node were provisioned therein.

Figure 7:
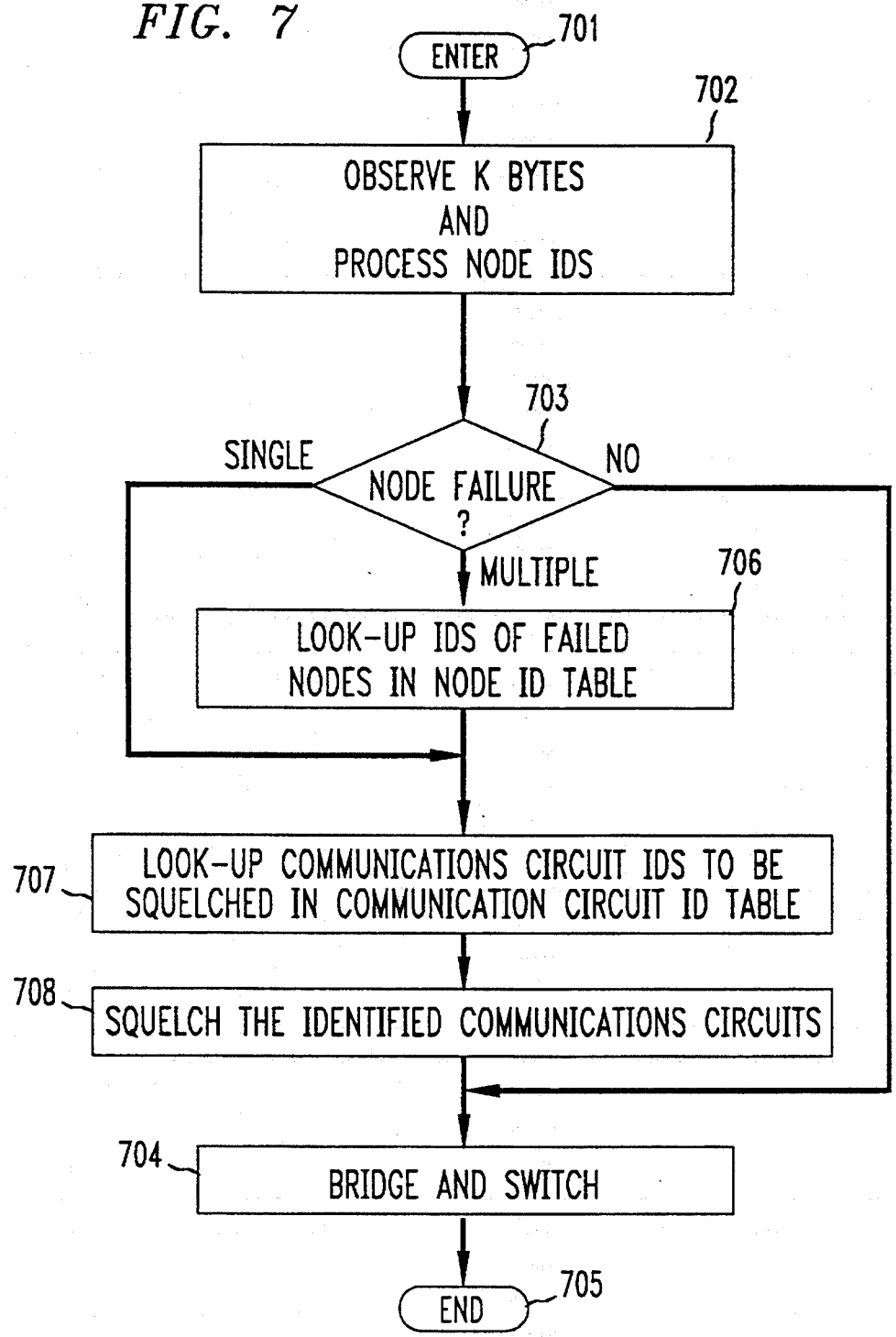
FIG. 7 is a flow chart illustrating the squelch and switch operation of the controller of FIG. 2.

FIG. 7 is a flow chart illustrating the operation of controller 205 in controlling the operation of the ring nodes in order to effect the deterministic squelching of communications circuits and the selective provisioning of the secondary duplex communications circuit connection(s) to secondary interworking ring node 114 for communications circuits terminated in their failed primary interworking ring node 112, in accordance with the invention. Specifically, the process is entered via step 701. Then, operational block 702 causes the K bytes of an incoming OC-N signal to be observed and processes the ring node IDs therein. Then, conditional branch point 703 tests to determine if the processed ring node IDs indicate that one or more ring nodes have failed. Again, a ring node failure is defined as to include node equipment failure and so-called node isolation failure caused by fiber cuts and the like. Specific examples of failure conditions are discussed below. Thus, if the processed ring node IDs indicate no ring node failure, the failure is other than a ring node and operational block 704 causes the usual bidirectional ring bridging and switching to be effected. Thereafter, the process is ended via step 705. If the processed ring node IDs indicate a multiple ring node failure, operational block 706 causes the failed ring node IDs to be obtained from the ring node ID look-up table in memory. Then, control is passed to operational block 707 which causes the identity (ID) of the affected communications circuits to be obtained from the communications circuit ID look-up table in memory. If step 703 indicates a single ring node failure, the failed ring node ID is already known and control is passed directly to step 707. Once the affected communications circuits are identified, operational block 708 causes the appropriate ones of squelchers (S) 204, 210, 217 and 219 (FIG. 2), in this example, to squelch those identified communications circuits in the ring node. As indicated above, all communications circuits active in this ring node that are terminated in a failed ring node are squelched, in accordance with the invention. For the purpose of squelching a broadcast communications circuit, only the first "A" and last "Z" terminations are used to trigger the squelching. A ring interworking communications circuit is treated, for the purpose of squelching, just like a broadcast communications circuit from its termination in bidirectional line-switched ring 100 to its primary shared node and secondary shared node. Operational block 704 causes the communications circuits not terminated in the failed ring node(s) to be bridged and switched to "heal" the ring. Thereafter, the process is ended in step 705.

Figure 8:
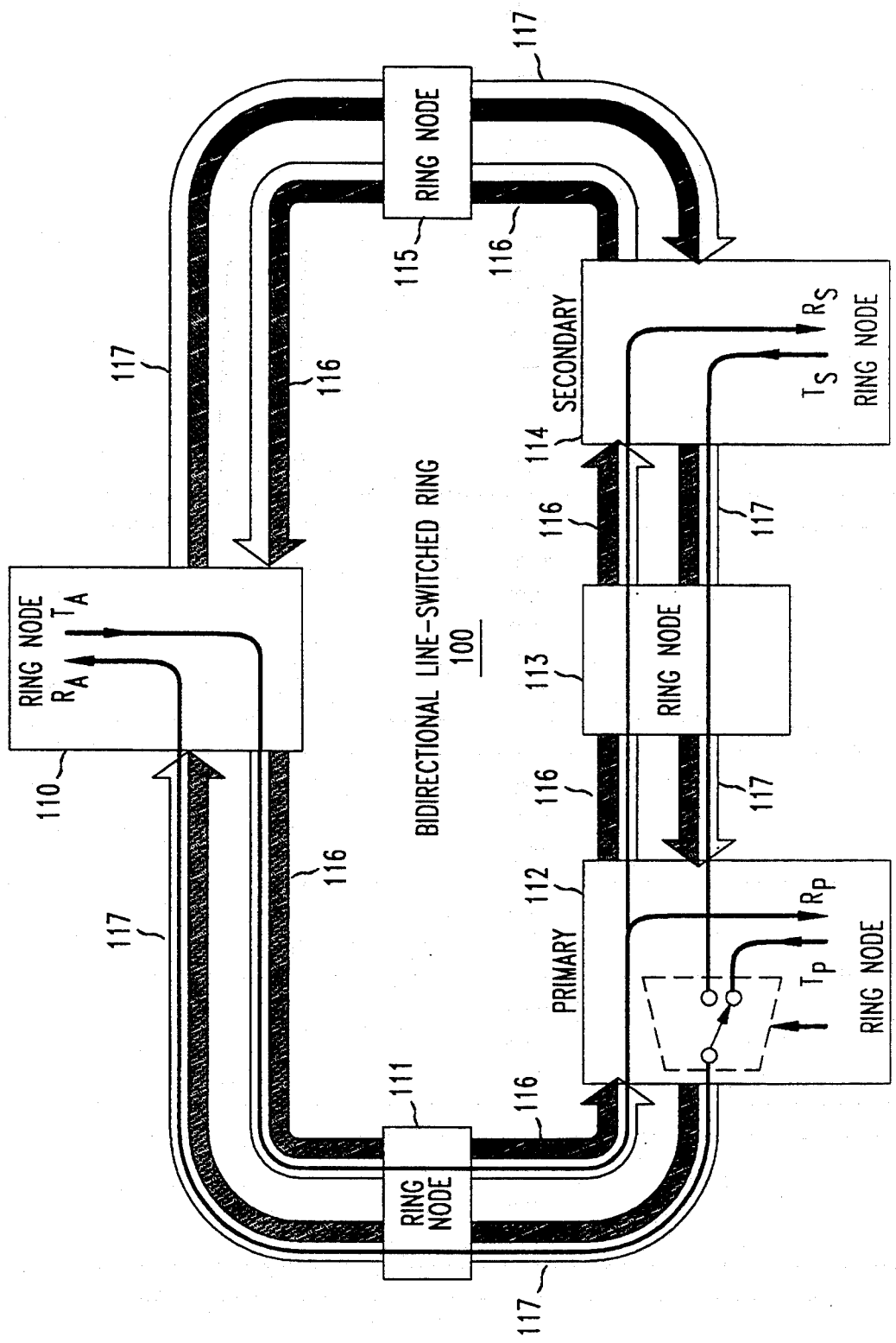
FIG. 8 illustrates the normal operation in bidirectional line-switched ring 100 including the first and an additional shared nodes.

FIG. 8 illustrates in simplified form a "normal" ring interworking communications circuit connection in bidirectional line-switched ring 100. Specifically, the communications circuit connection is between ring node 110, the A termination, and its primary interworking ring node 112. Thus, one portion ($T_A$) of the duplex communications circuit enters ring 100 at ring node 110 and is supplied in the service bandwidth of transmission path 116 through ring node 111 to its primary interworking ring node 112. The received portion of the communications circuit is normally handed-off as $R_P$ in ring node 112. However, the received portion is also passed along through ring node 113 to also be received at its secondary interworking ring node 114 as $R_S$. Similarly, another portion ($T_P$) of the duplex communications circuit normally enters ring 100 at its primary interworking ring node 112 and is selected to be supplied to the service bandwidth of transmission path 117. In transmission path 117, this portion of the communications circuit is passed through ring node 111 and received as $R_A$ at ring node 110. Additionally, this portion of the communications circuit is supplied as $T_S$ from secondary interworking ring node 114 in the service bandwidth of transmission path 117 through ring node 113 and is available to be selected for transmission at primary interworking ring node 112. As indicated above, this selection of $T_S$ occurs if the hand-off link fails in primary interworking ring node 112. It should be noted that ring node 112 can be provisioned to normally select the communications circuit $T_S$ from ring node 114.

Although not specifically shown in FIG. 7, it is noted that if the hand-off link fails in the primary interworking ring node 112 for a communications circuit, the affected communications circuit or portion of it is being broadcast along to be obtained in the secondary interworking ring node 114 for the communication circuit. Specifically, if the receive ($R_P$) portion of the hand-off link fails in primary interworking ring node 112, it is passed along via broadcast element 206 and 3:1 selector 207 (FIG. 2) and selected to be handed-off as R s in secondary interworking ring node 114. Similarly, if the transmit ($T_P$) portion of the hand-off link fails in primary interworking ring node 112, controller 205 in ring node 112 causes 3:1 selector 209 (FIG. 2) to select the transmit ($T_S$) portion of the communications circuit from secondary interworking ring node 114.

Figure 9:
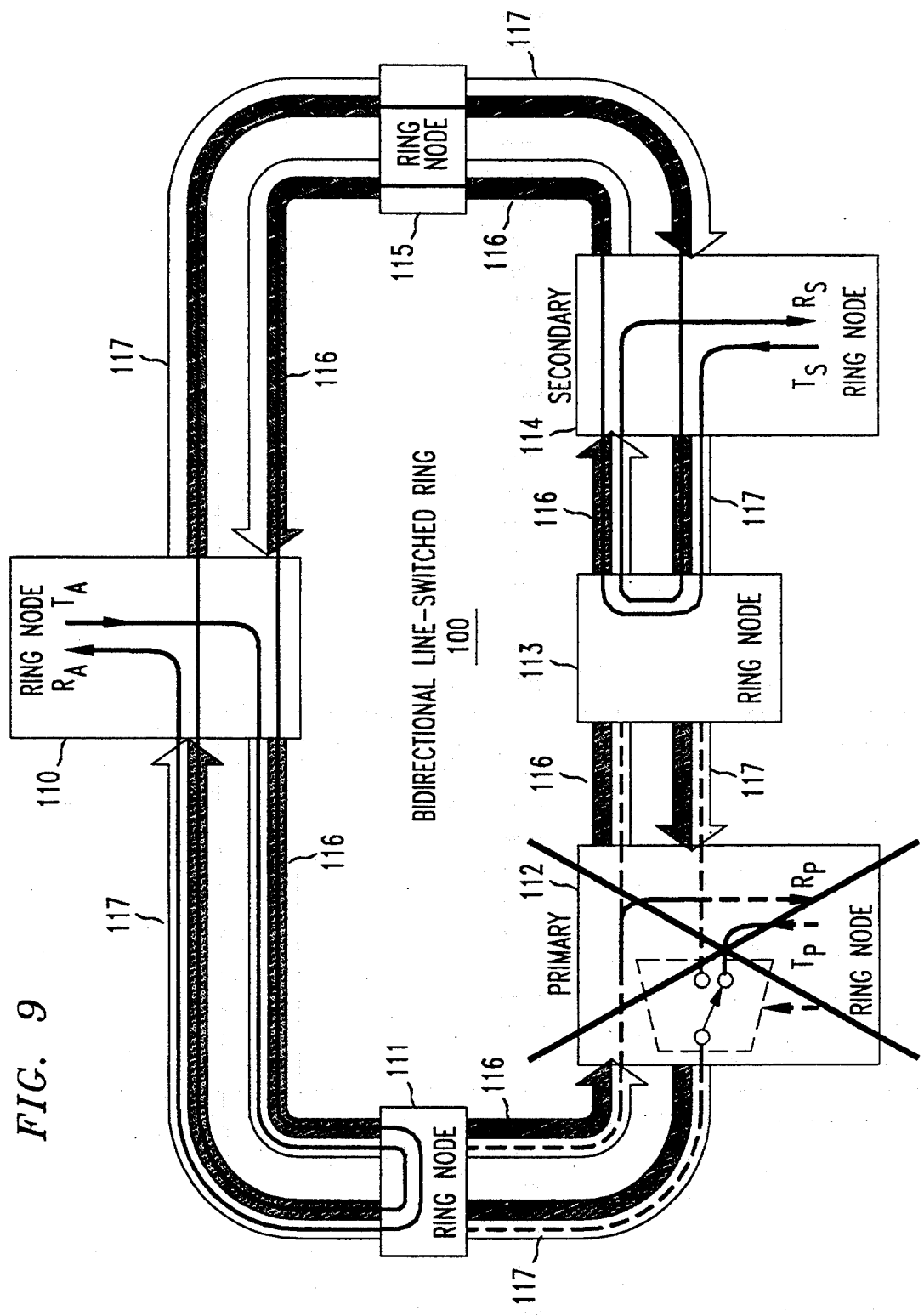
FIG. 9 illustrates the operation in bidirectional line-switched ring 100 in the presence of a failure of the first ring node 112.

FIG. 9 illustrates a secondary communications circuit connection which is effected, in accordance with the invention, when primary interworking ring node 112 for the communications circuit has failed. In this example, ring nodes 111 and 113 both detect loss-of-signal from primary interworking ring node 112 and both transmit a line-switch request message in a direction away from ring node 112. Thus, ring node 111 transmits a line-switch request message identifying a signal failure condition from primary interworking ring node 112 in the APS K1 byte on transmission path 117. Ring nodes 110, 115 and 114 recognize that the line-switch request message is not for an adjacent failed ring node and pass it on to ring node 113. Similarly, ring node 113 transmits a line-switch request message identifying a signal failure condition from primary interworking ring node 112 in the APS K1 byte on transmission path 116. Again, ring nodes 114, 115 and 110 recognize that the line-switch request message is not for an adjacent failed ring node and pass it on to ring node 111. Because ring nodes 111 and 113 both have detected a signal failure condition from primary interworking ring node 112 and the received line-switch request message indicating a signal failure condition in the opposite direction from ring node 112, they each know that the adjacent primary interworking ring node 112 has failed. Normally, when an adjacent ring node fails, all active communications circuits terminated in it would be squelched in order to eliminate possible communications circuit misconnections. However, since a secondary communications circuit connection for communications circuits terminated in their primary interworking ring node 112 has been provisioned, in accordance with the invention, those communications circuits are not squelched in ring nodes 111 and 113. Thus, as shown, a first portion ($T_A$) of the duplex communications circuit terminated in their primary interworking ring node 112 enters ring 100 at ring node 110 and is transmitted toward ring node 112 in the service bandwidth on transmission path 116. Upon failure of ring node 112, the communications circuit is looped back at ring node 111 to the protection bandwidth and transmitted toward secondary interworking ring node 114 on transmission path 117. Upon failure of ring node 112, the portion of the communications circuit received in the protection bandwidth on transmission path 117 is looped back at ring node 113 to the service bandwidth on transmission path 116 and supplied to its secondary interworking ring node 114 where it is received as $R_s$. Similarly, the other portion ($T_S$) of the communications circuit from failed its primary interworking ring node 112 terminated in ring node 110 is supplied in normal fashion by ring node 114 to the service bandwidth on transmission path 117. In ring node 113, it is looped back to the protection bandwidth on transmission path 116. At ring node 111, this portion of the communications circuit is looped to the service bandwidth on transmission path 117. It is then supplied to ring node 110 where it is received in normal fashion as $R_A$.

Figure 10:
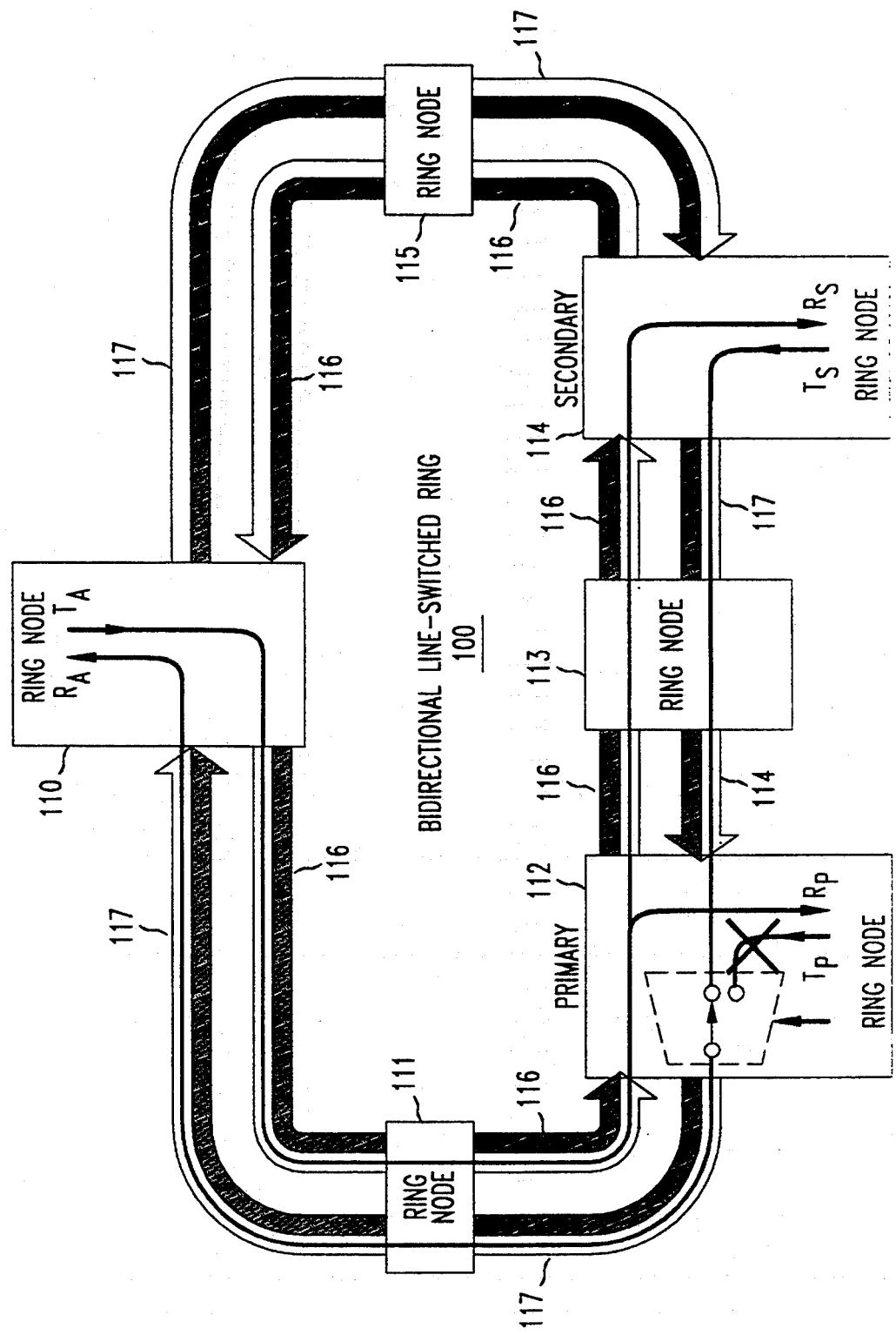
FIG. 10 illustrates the operation in bidirectional line-switched ring 100 in the presence of a failure of a so-called hand-off link to the first ring node 112.

FIG. 10 illustrates the ring interworking communications circuit transmission in ring 100 when a failure arises in the hand-off link in its primary interworking node 112. As indicated above, when a portion of the hand-off link fails, for example, the transmit portion $T_P$, the same "good" transmit signal $T_S$ from secondary interworking ring node 114 is selected, in accordance with the invention, in primary interworking ring node 112 to be supplied in the service bandwidth on transmission path 117 to ring node 110. Primary interworking ring node 112 can still select the received portion ($R_P$) of the communications circuit from ring node 110. However, if the received portion of the hand-off link has failed, secondary interworking ring node 114 selects the received signal ($R_S$), which is passed-on from primary interworking ring node 112, in accordance with the invention.

The above-described arrangements are, of course, merely illustrative of the application of the principles of the invention. Other arrangements may be devised by those skilled in the art without departing from the spirit or scope of the invention.

I claim:

1. A first ring node for use in a first ring transmission system, comprising:
   a means for monitoring signals into the first ring node to determine whether a second ring node in the first ring transmission system has failed, wherein the second ring node connects the first ring transmission system to a second ring transmission system;
   a means responsive to a determination that the second ring node has failed for detecting an active communications circuit passing through the first ring node and terminated in the second ring transmission system; and
   a means for redirecting the active communications circuit to a third ring node in the first ring transmission system, wherein said redirecting means is responsive to the detecting means and the third ring node connects the first transmission system to the second ring transmission system.

2. The apparatus of claim 1 in which the first ring node is adjacent to the second ring node in the first ring transmission system.

3. The apparatus of claim 1 in which the first ring transmission system is a bidirectional line-switched ring transmission system.

4. The apparatus of claim 1 further including a means for passing on to the third ring node one or more communications circuits to be received in the second ring node and a means for controllably selecting one or more communication circuits from the third ring node which one or more communications circuits were intended to be added at the second ring node when the second ring node is connected to a second ring transmission system.

5. The apparatus of claim 1 in which the active communications circuits include communications circuits to be added at the first ring node, communications circuits to be dropped at the first ring node, and communications circuits passing through the first ring node, including the identity of any communications circuits terminated in the second ring node.

6. The apparatus of claim 5 in which the means for monitoring includes a means for detecting a signal failure condition incoming to the first ring node on either a first or a second transmission path in the first ring transmission, the first and second transmission paths connecting a plurality of ring nodes including the first, second, and third ring nodes, and a means for detecting line-switch request messages in digital signals incoming to the first ring node on either of the first and second transmission paths.

7. The apparatus of claim 6 in which each of the first and second transmission paths comprises service bandwidth and protection bandwidth, the line-request message being transported in an automatic protection switch channel in the protection bandwidth of either the first transmission path or the second transmission path.

8. The apparatus of claim 7 in which the automatic protection switch channel comprises at least a K1 byte in overhead of the protection bandwidth.

9. The apparatus of claim 6 further including a means for storing identities of each one of the plurality of ring nodes in the first ring transmission system and in which the means for monitoring is responsive to the detected line-switch request messages for obtaining the identity of a failed one of the plurality of ring nodes from the means for storing the identities.

10. The apparatus of claim 9 further including means for blocking the communications circuits terminated in the failed second ring node when the third ring node has also failed, or any one of the plurality of ring nodes in which any of the active communications circuits are terminated has also failed.

11. The apparatus of claim 10 in which the means for blocking includes a means for generating an alarm indication signal and a means for inserting the alarm indication signal in prescribed byte positions in the communications circuits to be blocked.

12. The apparatus of claim 7 in which the means for detecting a signal failure condition detects a signal failure condition on either the first or second transmission path incoming to the first ring node and further includes a means for generating a line-switch request message including the identity of one of the plurality of ring nodes, if it is adjacent to the first ring node, from the direction that the signal failure condition was detected and a means for inserting the generated line-switch request message in the automatic protection switch channel in the protection bandwidth of one of the first or second transmission paths in a direction away from the detected failed one of the plurality of ring nodes.

13. A first ring transmission system, including a plurality of interconnected ring nodes, at least two of the ring nodes serving as connections to a second ring transmission system, at least one of the interconnected ring nodes comprising:
 a means for monitoring signals into the at least one of the interconnected ring nodes to determine whether one of the at least two ring nodes has failed;
 a means for detecting an active communications circuit passing through the at least one of the interconnected ring nodes and terminated in the second ring transmission system wherein said detecting means is responsive to a determination that one of the at least two ring nodes has failed; and
 a means for redirecting the active communications circuit to another of the at least two ring nodes wherein said redirecting means is responsive to the detecting means.

14. The apparatus of claim 13 in which one of the at least two rings node is adjacent to another of the at least two ring nodes in the first ring transmission system.

15. The apparatus of claim 13 in which the first ring transmission system is a bidirectional line-switched ring transmission system.

16. The apparatus of claim 13 further including a means for passing on to one of the at least two ring nodes, one or more communications circuits to be received in another of the at least two ring nodes, and a means for controllably selecting one or more communication circuits from one of the at least two ring nodes which one or more communications circuits were intended to be added at the one of the at least two ring nodes when the one of the at least two ring node is connected to a second ring transmission system.

17. The apparatus of claim 13 in which the active communications circuits include communications circuits to be added at the one of at least two ring nodes, communications circuits to be dropped at the one of at least two ring nodes, and communications circuits passing through the one of at least two ring nodes, including the identity of any communications circuits terminated in another of the at least two ring nodes.

18. The apparatus of claim 17 in which the means for monitoring includes a means for detecting a signal failure condition incoming to the one of at least two ring nodes on either a first or a second transmission path in the first ring transmission, the first and second transmission paths connnecting the at least two ring nodes, and a means for detecting line-switch request messages in digital signals incoming to the one of at least two ring nodes on either of the first and second transmission paths.

19. The apparatus of claim 18 in which each of the first and second transmission paths comprises service bandwidth and protection bandwidth, the line-request message being transported in an automatic protection switch channel in the protection bandwidth of either the first transmission path or the second transmission path.

20. The apparatus of claim 19 in which the automatic protection switch channel comprises at least a K1 byte in overhead of the protection bandwidth.

21. The apparatus of claim 18 further including a means for storing identities of each of the at least two ring nodes in the first ring transmission system and in which the means for monitoring is responsive to the detected line-switch request messages for obtaining the identity of a failed one of the at least two ring nodes from the means for storing the identities.

22. The apparatus of claim 21 further including a means for blocking the communications circuits terminated in the failed one of at least two ring nodes when another of the least two ring nodes has also failed, or any of the at least two ring nodes in which any of the active communications circuits are terminated have also failed.

23. The apparatus of claim 22 in which the means for blocking includes a means for generating an alarm indication signal and a means for inserting the alarm indication signal in prescribed byte positions in the communications circuits to be blocked.

24. The apparatus of claim 19 in which the means for detecting a signal failure condition detects a signal failure condition on either the first or second transmission path incoming to the one of at least two ring nodes and further includes a means for generating a line-switch request message including the identity of another of the at least two ring nodes, if it is adjacent to the one of at least two ring nodes, from the direction that the signal failure condition was detected and a means for inserting the generated line-switch request message in the automatic protection switch channel in the protection bandwidth of one of the first or second transmission paths in a direction away from the detected failed one of at least two ring nodes.

25. A method for use with at least one of a plurality of interconnected ring nodes in a first ring transmission system, at least two of the plurality of ring nodes serving as connections to a second ring transmission system, the method comprising the steps of:
monitoring signals into the at least one of the interconnected ring nodes to determine whether one of the at least two ring nodes has failed;
detecting an active communications circuit passing through the at least one of the interconnected ring nodes and terminated in the second ring transmission system in response to a determination that one of the at least two ring nodes has failed; and
redirecting the active communications circuit to another of the at least two ring nodes in response to the detected active communications circuit.

26. The method of claim 25 in which one of the at least two ring nodes is adjacent to another of the at least two ring nodes in the first ring transmission system.

27. The method of claim 25 in which the first ring transmission system is a bidirectional line-switched ring transmission system.

28. The method of claim 25 further including a step for passing on to one of the at least two ring nodes, one or more communications circuits to be received in another of the at least two ring nodes, and a step of controllably selecting one or more communication circuits from one of the at least two ring nodes which one or more communications circuits were intended to be added at the one of the at least two ring nodes when the one of the at least two ring nodes is connected to a second ring transmission system.

29. The method of claim 25 in which the active communications circuits include communications circuits to be added at the one of at least two ring nodes, communications circuits to be dropped at the one of at least two ring nodes, and communications circuits passing through the one of at least two ring nodes, including the identity of any communications circuits terminated in another of the at least two ring nodes.

30. The method of claim 29 in which the step of monitoring includes a step of detecting a signal failure condition incoming to the one of at least two ring nodes on either a first or a second transmission path in the first ring transmission system, the first and second transmission paths connnecting the at least two ring nodes, and a step of detecting line-switch request messages in digital signals incoming to the one of at least two ring nodes on either of the first and second transmission paths.

31. The method of claim 30 in which each of the first and second transmission paths comprises service bandwidth and protection bandwidth, the line-request message being transported in an automatic protection switch channel in the protection bandwidth of either the first transmission path or the second transmission path.

32. The method of claim 31 in which the automatic protection switch channel comprises at least a K1 byte in overhead of the protection bandwidth.

33. The method of claim 30 further including a step of storing identities of each of the at least two ring nodes in the first ring transmission system and in which the step of monitoring is responsive to the detected line-switch request messages for obtaining the identity of a failed one of the at least two ring nodes from the stored identities.

34. The method of claim 33 further including a step of blocking the communications circuits terminated in the failed one of at least two ring nodes when the another of the at least two ring nodes has also failed, or any of the at least two ring nodes in which any of the active communications circuits are terminated have also failed.

35. The apparatus of claim 34 in which the step of blocking includes a step of generating an alarm indication signal and a step of inserting the alarm indication signal in prescribed byte positions in the communications circuits to be blocked.

36. The method of claim 31 in which the step for detecting a signal failure condition detects a signal failure condition on either the first or second transmission path incoming to the one of at least two ring nodes and further includes a step for generating a line-switch request message including the identity of another of the at least two ring nodes, if it is adjacent to the one of at least two ring nodes, from the direction that the signal failure condition was detected and a step of inserting the generated line-switch request message in the automatic protection switch channel in the protection bandwidth of one of the first or second transmission paths in a direction away from the detected failed one of at least two ring nodes.

* * * * *